United States Patent [19]
McEwan

[11] Patent Number: 5,661,385
[45] Date of Patent: Aug. 26, 1997

[54] WINDOW-CLOSING SAFETY SYSTEM

[75] Inventor: Thomas E. McEwan, Livermore, Calif.

[73] Assignee: The Regents of the University of California, Oakland, Calif.

[21] Appl. No.: 510,981

[22] Filed: Aug. 3, 1995

Related U.S. Application Data

[63] Continuation-in-part of Ser. No. 359,090, Dec. 19, 1994.

[51] Int. Cl.$^6$ ............................ H01P 7/10; H02P 1/22
[52] U.S. Cl. .................. 318/478; 324/642; 340/552; 340/561
[58] Field of Search .......................... 318/280, 283, 318/449–451, 478–483, 489; 324/532–535, 519–531, 632–646; 340/545, 547, 551–554, 561, 562, 565, 567, 600, 648, 680

[56] References Cited

U.S. PATENT DOCUMENTS

| | | | |
|---|---|---|---|
| 4,197,529 | 4/1980 | Ramstedt et al. | 340/566 |
| 4,833,918 | 5/1989 | Jean et al. | 73/290 V |
| 4,983,896 | 1/1991 | Sugiyama et al. | 318/286 |
| 5,155,439 | 10/1992 | Holmbo et al. | 324/534 |
| 5,227,667 | 7/1993 | Takinami et al. | 307/129 |
| 5,345,471 | 9/1994 | McEwan | 375/1 |
| 5,376,888 | 12/1994 | Hook | 324/643 |
| 5,382,910 | 1/1995 | Walsh | 324/533 |
| 5,412,297 | 5/1995 | Clark et al. | 318/468 |
| 5,448,222 | 9/1995 | Harman | 340/566 |
| 5,495,137 | 2/1996 | Park et al. | 310/331 |

*Primary Examiner*—Brian Sircus
*Attorney, Agent, or Firm*—Henry P. Sartorio; Richard B. Main

[57] ABSTRACT

A safety device includes a wire loop embedded in the glass of a passenger car window and routed near the closing leading-edge of the window. The wire loop carries microwave pulses around the loop to and from a transceiver with separate output and input ports. An evanescent field only and inch or two in radius is created along the wire loop by the pulses. Just about any object coming within the evanescent field will dramatically reduce the energy of the microwave pulses received back by the transceiver. Such a loss in energy is interpreted as a closing area blockage, and electrical interlocks are provided to halt or reverse a power window motor that is actively trying to close the window.

6 Claims, 3 Drawing Sheets

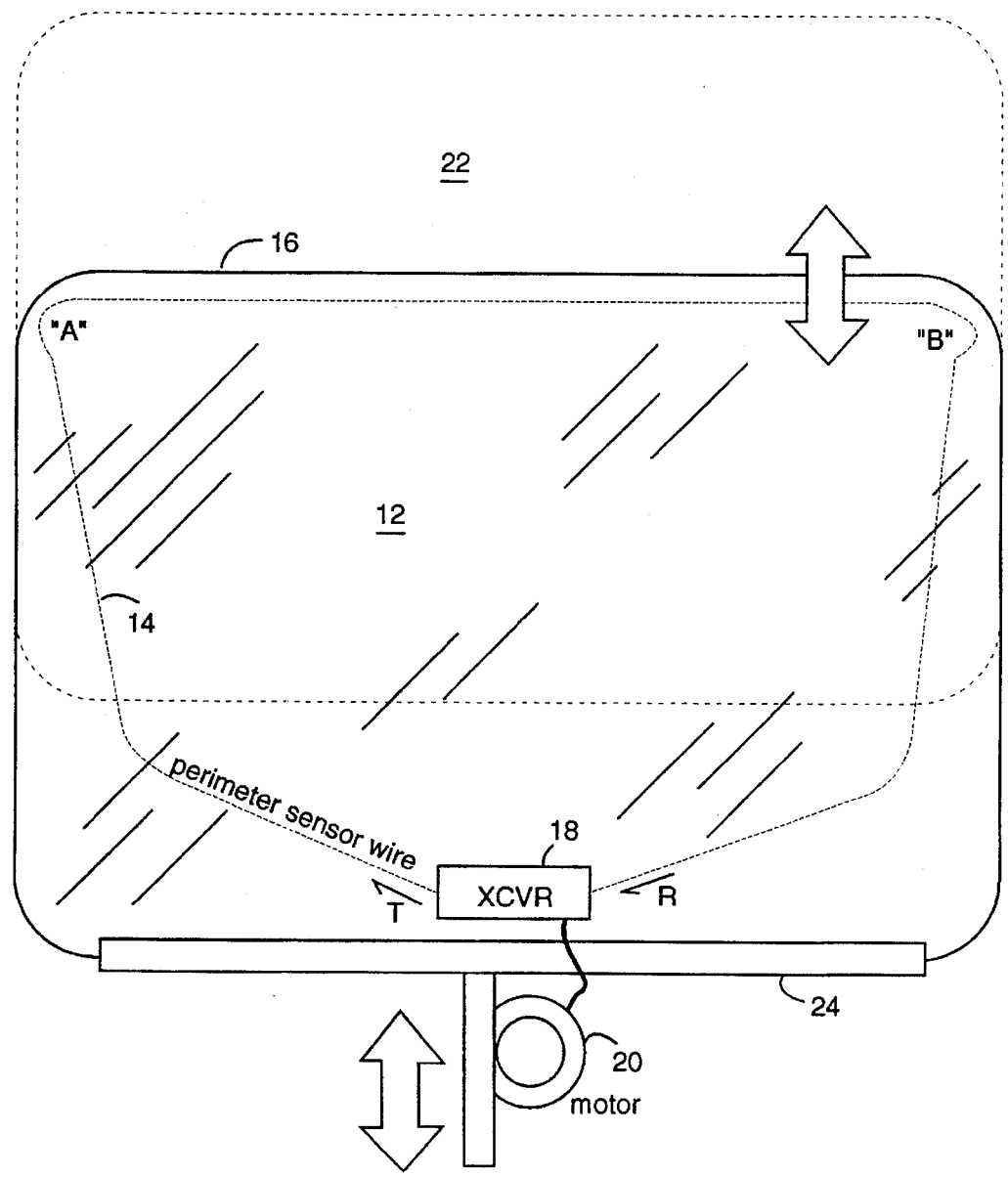

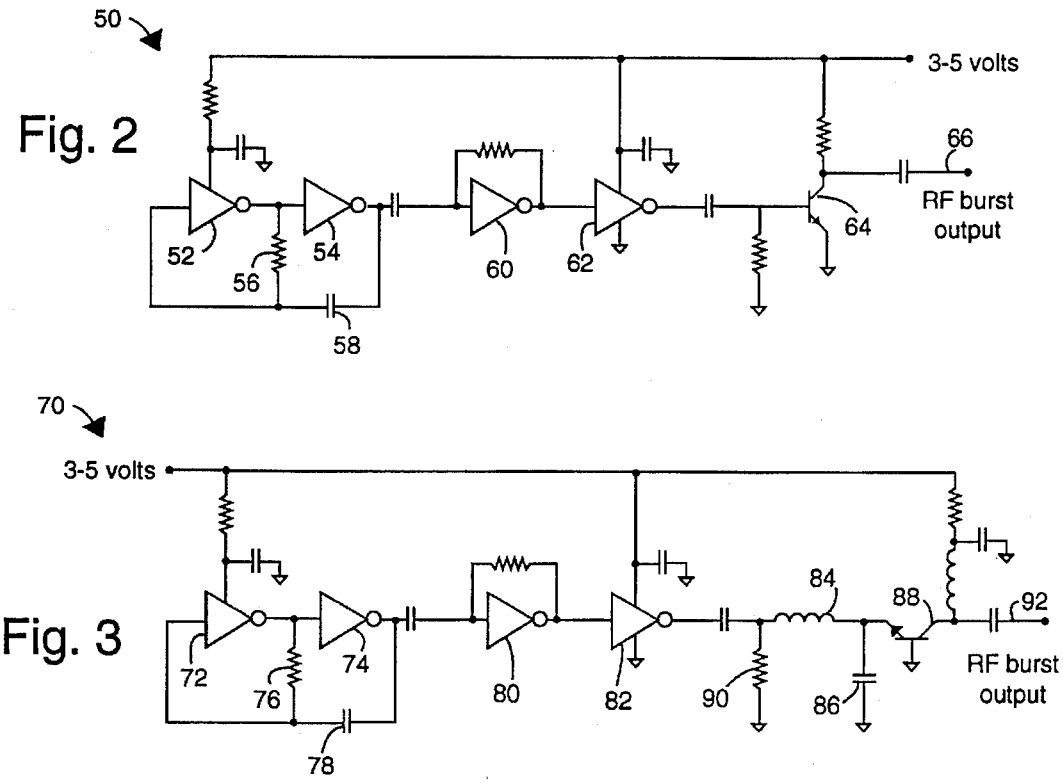
Fig. 2
Fig. 3
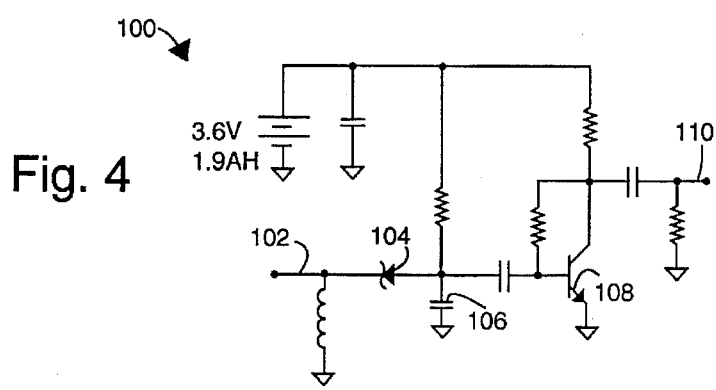
Fig. 4

WINDOW-CLOSING SAFETY SYSTEM

RELATED APPLICATION

This application is a continuation-in-part of copending U.S. patent application, Ser. No. 08/359,090, filed Dec. 19,1994, and titled ELECTRONIC MULTI-PURPOSE MATERIAL LEVEL SENSOR, which is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to automobile safety devices and more particularly to obstruction sensing for passenger car power windows with glass-embedded "smart wires" connected to ultra-wideband evanescent field disturbance sensors.

2. Description of Related Art

Several very tragic accidents have occurred over the years involving automobile power windows that closed and injured people, especially children. The federal government is likely to impose stiff regulations in the next five years that will mean an end to power window accessories if some reliable safety mechanism cannot be included. Some research has been conducted in equipping the power window motors with torque sensors that will reverse the direction if some resistance is encountered in a closing window. Similar, but quite simple torque sensors are found in automatic garage door openers that will reverse when closing if sufficient closing resistance is encountered before the full travel has finished. However, such torque sensing is unreliable, and an injurious amount of closing force can be applied by a power window so equipped.

Passenger car applications present a unique challenge for safety equipment solutions which need to be robust, reliable, easy to service, inexpensive to manufacture and have life times that exceed the car as a whole. The lining of window openings with touch-sensitive membranes or the placing of micro-switches behind escutcheon pieces to sense the pinching of obstructions in the window opening are each inadequate on one or more of these requirements.

SUMMARY OF THE INVENTION

An object of the present invention is to provide a safety device for power windows.

A further object of the present invention is to provide a sensor to reverse an automatic closing device when solid obstacles are in the closure area or otherwise in danger of being harmed or causing damage.

A still further object of the present invention is to provide a security device to detect intrusion or intruders with a sense wire that does not require contact and that is difficult to circumvent or spoof.

Another object of the present invention is to provide a method for detecting objects that come into close proximity with glass windows.

Briefly, a preferred embodiment of the present invention comprises a wire loop embedded in the glass of a passenger car window and routed near the closing leading-edge of the window. The wire loop carries microwave pulses around the loop to and from a transceiver with separate output and input ports. An evanescent field only and inch or two in radius is created along the wire loop by the pulses. Just about any object coming within the evanescent field will dramatically reduce the energy of the microwave pulses received back by the transceiver. Such a loss in energy is interpreted as a closing area blockage, and electrical interlocks are provided to halt or reverse a power window motor that is actively trying to close the window.

An alternative, lesser-preferred embodiment of the present invention comprises a wire whip embedded in the glass of a passenger car window and routed near the closing leading-edge of the window. A microwave pulse transmitter is connected to the wire whip which directs the formation of an evanescent field only and inch or two in radius. The microwave pulses that traverse the whole wire and reflect back off the end are returned too late to be interpreted as being caused by an obstruction of the closing leading-edge of the window. But just about any object coming within the evanescent field will cause reflections to be set up that can be gated by a time domain reflectometer according to their source position on the wire whip. Such reflected energy is interpreted as a closing area blockage, and electrical interlocks are provided to halt or reverse a power window motor that is actively trying to close the window.

An advantage of the present invention is that a power window safety device is provided that is inexpensive and reliable.

Another advantage of the present invention is that a sensor is provided that reverses an automatic closing device when solid obstacles are detected in the closure area.

A further advantage of the present invention is that a timing generator is provided that can detect objects that come into close proximity with glass windows.

BRIEF DESCRIPTION OF THE DRAWINGS

FIG. 1A is a diagram of a preferred power window safety system embodiment of the present invention with a loop sense wire;

FIG. 2 is a schematic diagram of a preferred strip sensor transmitter, as can be included in the power window safety system of FIG. 1;

FIG. 3 is a schematic diagram of a pulse transmitter, as can be included in the power window safety system of FIG. 1; and FIG. 4 is a schematic diagram of a pulse receiver, as can be included in the power window safety system of FIG. 1.

DETAILED DESCRIPTION OF THE INVENTION

Figure 1B:
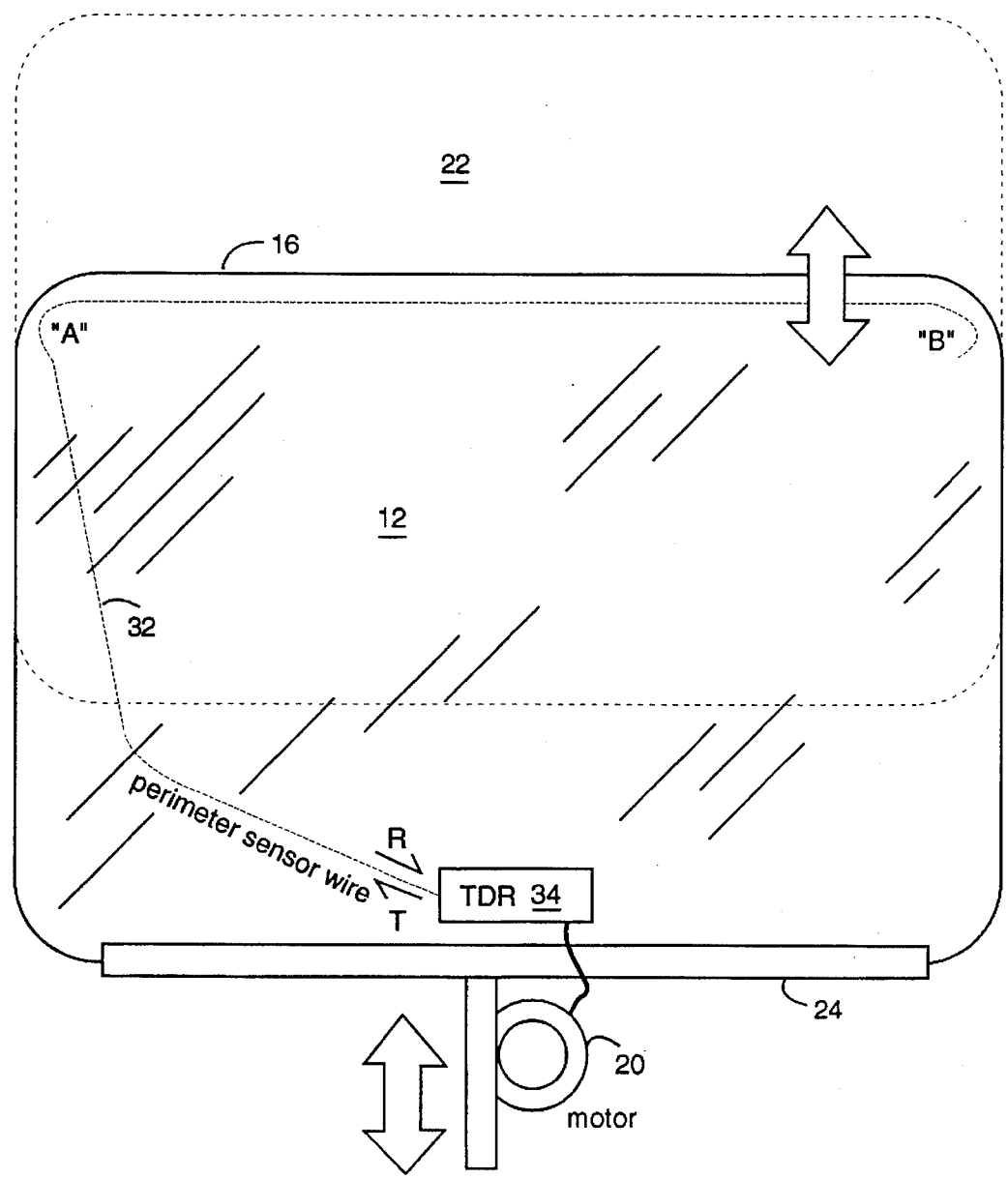
FIG. 1B is a diagram of a power window safety system in a second embodiment of the present invention with a wire whip and a time domain reflectometer.

FIG. 1A shows an automobile-door power-window safety system embodiment of the present invention, referred to herein by the general reference numeral 10. The system 10 comprises a glass pane 12 with an embedded perimeter sensor wire 14 that is routed near a closing edge 16.

The system 10 operates in a forward mode in which microwave pulses are circulated in a loop on wire 14 near a closing edge 16 and between a transmitter and a receiver in a transceiver module 18. An evanescent field only and inch or two in radius is created along the wire loop by the microwave pulses. Just about any object coming within the evanescent field will dramatically reduce the energy of the microwave pulses received at the end of the loop. Such a loss in energy is interpreted as a closing area blockage, and electrical interlocks are provided to halt or reverse a power window motor 20 that is actively trying to close the window. For further information about the nature of the signals used and the implementation of the transceiver module 18, see, U.S. Pat. No. 5,345,471, issued Sep. 6,1994, incorporated herein by reference.

The motor 20 opens and closes the window pane 12 through a closure area 22. A thick foam rubber gasket may be used to engage the closing edge 16 and to allow some crush distance to accommodate reversing delays in the motor 20. A metal support channel 24 holds the glass pane 12 and mechanically connects to the motor 20.

FIG. 1B shows a window safety system in a second embodiment of the present invention, referred to herein by reference numeral 30. Items in system 30 that are equivalent to those in system 10 have the same reference numerals. The system 30 comprises a single-ended perimeter sensor wire 32 having about a 100Ω transmission line impedance connected to a time domain reflectometer (TDR) 34, e.g., as described in the present parent case, U.S. patent application Ser. No. 08/359,090, filed Dec. 19,1994. Pulses are launched out of the TDR 34 against the metal support channel 24 and will dissipate in an evanescent field along the wire 32. An object coming into close or actual contact with the wire 32 will cause a pulse reflection having as much as 10% of the original pulse transmission energy. Such energy is reflected back to the TDR 34. The presence of such reflections, especially reflections indicating by their timing a point of reflection lying between points "A" and "B", constitutes the detection of an object in area 22 and the necessity for a reversal of the motor 20.

Whenever there are no foreign objects near the wire 32, there will not be any major pulse reflections. Only slight reflections will occur, e.g., where the wire bends. Such reflections are set below a detection threshold in the TDR 34. Time-gating of the reflected pulses is used such that only reflections from along the edge 16 will return within a narrow time slot. Such time-gating helps eliminate false triggering, e.g., as caused along the window channel along sides of the pane, or from the far side of the wire past point "B". Relocating the wire further into the pane aides in reducing unwanted reflections. By setting the detection amplitude for the reflected pulses to a low sensitivity level, the detection range of the system can be kept short to avoid detecting the window frame as the window pane nears the top of its travel. Thus, objects such as fingers need to come into contact or near-contact with the top edge of the window to produce a detectable reflection.

In operation, the motor 20 is permitted by the module 18 and TDR 34 to close the window pane 12 through the closure area 22 as long as no obstruction is detected between points "A" and "B". If a reflection or disturbance is detected by the module 18 or TDR 34, the motor 20 is commanded to reverse so that the closure area is widened to allow such obstruction to be cleared or the trapped person to escape before being seriously injured. FIGS. 2–4 illustrate the construction of the module 18 in more detail. The parent case describes the construction of the TDR 34.

In FIG. 2, a preferred strip sensor transmitter 50 periodically issues a fast rise-time pulse and comprises a pair of inverters 52 and 54 with a resistor-capacitor combination 56 and 58. The transmitter 50 is configured as a 200 KHz pulse repetition frequency (PRF) generator. For example, a type 74HC04 inverter may be used with a 470K ohm resistor and a 4.7 picofarad capacitor. Another pair of inverters 60 and 62 provide amplification and square-wave shaping to drive a transistor 64 as a switch on and off. For example, the inverters 60 and 62 may comprise a type 74AC04 logic device and the transistor 64 may be a type NE85633. A signal with a very sharp falling edge is coupled to an output 56. For example, a single 200 picosecond pulse edge will be output at the PRF. The output 66 is connected to the sensing wire 14 (FIG. 1A).

In FIG. 3, a pulse transmitter 70 comprises a pair of inverters 72 and 74 with a resistor-capacitor combination 76 and 78 configured as a 200 KHz pulse repetition frequency (PRF) generator. For example, a type 74HC04 inverter may be used with a 470K ohm resistor and a 4.7 picofarad capacitor. Another pair of inverters 80 and 82 provide signal amplification and square-wave shaping. An inductor 84 and a capacitor 86 partially form a resonant circuit for operation of a transistor 88 as a Colpitts-type radio frequency oscillator in a common-base configuration at two gigahertz. The transistor base and collector inductance constitute the remaining part of the resonant circuit. A resistor 90 provides the DC bias return for the transistor 88. For example, the inverters 80 and 82 may comprise a type 74AC04 logic device and the transistor 88 may be a type NE85633. A two gigahertz radio frequency burst at the 200 KHz PRF is coupled to an output 92, which is connected to the sensing wire 14 (FIG. 1A).

FIG. 4 shows a receiver 100 suitable for use in the module 18 (FIG. 1A). The far end of the wire 14 is connected to an input 102 that high-passes signals to a Schottky peak detector diode 104. The amplitude modulation of the peak detected RF or fast-pulse signal is smoothed by a capacitor 106 and amplified by a low-frequency transistor 108. An output 110 provides a signal, e.g., a 0.1–2.0 volt pulse, that can be used to trigger a conventional motor reversing relay. As shown, the output 110 will pulse when there has been a change of condition. Ordinarily, with no obstruction in area 22, the voltage across capacitor 106 will be relatively high. But when an obstruction causes the signals at input 102 to be attenuated by setting up reflections in the evanescent field, the voltage across the capacitor 106 will decrease. A comparator with an adjustable threshold can be connected across the capacitor 106 to control a motor interlock relay or alarm. The DC state will continuously indicate whether the area 22 seems to be clear or is blocked. It no doubt will occur to artisans to control the motor and to tap into the receiver in any number of ways.

A deep V-shaped rubber gasket can be used to receive the top edge 16 of the window pane 12. The gasket is wide at the open end to minimize reflections as the embedded wire nears it. If a finger or arm is in contact with this gasket as the window is being raised, the gasket provides a reasonable distance for 'give' before the motor shuts off or reverses. Naturally, for odd-shaped windows, the detection wire can be routed close to the window pane edge to suit any geometry. A localized object, such as a finger, will cast the same peak-amplitude reflection as a distributed object, such as the entire length of the top window gasket. Thus, with proper geometry as shown in FIGS. 1A and 1B, the system can easily detect a finger while ignoring the approaching window frame.

Although particular embodiments of the present invention have been described and illustrated, such is not intended to limit the invention. Modifications and changes will no doubt become apparent to those skilled in the art, and it is intended that the invention only be limited by the scope of the appended claims.

For example, driveway gates and mechanisms that are subject to children climbing on them may have a sense wire, such as wire 14, positioned along the top ridge of the movable gate. If an object is detected in close proximity, the gate is prevented from automatic operation.

The present invention may also be useful in home or car security systems. A window security protection system is configured similar to that shown in FIG. 1A. But instead of providing an interlock to a power window motor, and interlock is provided to disable the ignition of a car or sound an alarm.

The invention claimed is:

1. An object-sensing mechanism, comprising:

a closeable opening in which a foreign object may be present;

a single-conductor wire attached to a structure configured to close said closeable opening and having first and second ends and one section located near said opening for sensing the near proximity of said foreign object in said opening as manifested by a disturbance of a wideband microwave evanescent field;

pulse generation means connected to the wire at said first end for periodically issuing submicrosecond rise time pulses along the wire providing for said wideband microwave evanescent field; and time domain reflectometer receiver means connected to the wire at said first end for detecting radio reflections caused by said disturbance of said wideband microwave evanescent field and providing for the interpretation of said disturbance as manifesting the presence of said foreign object in said opening.

2. The mechanism of claim 1, further comprising:

a time base connected to the time domain reflectometer receiver means for discriminating said detected radio reflections caused by said disturbance of said wideband microwave evanescent field that occurred near said one section located near said opening; and a controller connected to the timing means for interrupting power to a motor when said detected radio reflections are determined to come from near said one section located near said opening.

3. An object-sensing mechanism, comprising:

a doseable opening in which a foreign object may be present;

a single-conductor wire attached to a structure configured to close said closeable opening and having first and second ends and one section located near said opening for sensing the near proximity of said foreign object in said opening as manifested by a disturbance of a wideband microwave evanescent field;

pulse generation means connected to the wire at said first end for periodically issuing submicrosecond rise time pulses along the wire providing for said wideband microwave evanescent field; and forward-mode receiver means connected to the wire at said second end for detecting diminished pulse energy caused by said disturbance of said wideband microwave evanescent field and providing for the interpretation of said disturbance as manifesting the presence of said foreign object in said opening.

4. The mechanism of claim 3, further comprising:

a controller connected to the forward-mode receiver for interrupting power to a motor when said diminished pulse energy is detected.

5. A window-closing safety system, comprising:

a wire embedded in the periphery of a window glass that can be closed in an opening and for sensing the near proximity of a foreign object as manifested by a disturbance of a wideband microwave evanescent field;

pulse generation means connected to the wire for periodically issuing submicrosecond rise time pulses along the wire providing for said wideband microwave evanescent field;

receiver means connected to the wire for detecting radio reflections caused by said disturbance of said wideband microwave evanescent field; and a motor electrically connected to the receiver means and mechanically connected to said window glass for closing said opening.

6. The system of claim 5, further comprising:

interruption means connected to the receiver means and the motor for preventing the motor from closing said window glass in said opening when said radio reflections are detected, wherein foreign objects are not trapped by said window glass closing further.

* * * * *